United States Patent [19]
Fujikawa et al.

[11] 4,165,207
[45] Aug. 21, 1979

[54] ACTUATION DEVICE FOR A TACHOMETER FOR AN ENGINE

[75] Inventors: Tetsuzo Fujikawa, Kobe; Ryoji Uda, Kakogawa, both of Japan

[73] Assignee: Kawaki Jukogyo Kabushiki Kaisha, Hyogo, Japan

[21] Appl. No.: 868,546

[22] Filed: Jan. 11, 1978

Related U.S. Application Data

[63] Continuation of Ser. No. 687,644, May 18, 1976, abandoned.

[51] Int. Cl.$^2$ ............................................. F16N 13/04
[52] U.S. Cl. .................................. 417/313; 417/499; 417/500; 184/32; 184/35; 184/36
[58] Field of Search ................. 74/12; 184/26, 31, 32, 184/35, 36; 417/313, 499, 500

[56] References Cited
U.S. PATENT DOCUMENTS

| | | | |
|---|---|---|---|
| 2,443,046 | 6/1948 | Mansen | 74/12 X |
| 3,302,752 | 2/1967 | Shiokawa | 184/26 X |
| 3,794,010 | 2/1974 | Palma | 184/31 X |
| 3,938,622 | 2/1976 | Denson | 184/32 X |

Primary Examiner—Alan Cohan
Attorney, Agent, or Firm—Toren, McGeady and Stanger

[57] ABSTRACT

An actuation device for a tachometer adapted to transmit the revolutions of an engine crankshaft to the tachometer, wherein the oil pump of the engine is utilized as a speed reducing mechanism for transmitting the revolutions of the engine crankshaft to the tachometer after the engine speed is reduced. A cable connected at one end to the plunger of the oil pump whose speed is reduced by means of a gearing is connected at the other end to the tachometer. Thus, by utilizing the oil pump, it is possible to transmit the revolutions of the engine crankshaft to the tachometer without requiring a speed reducing mechanism provided exclusively for the tachometer.

2 Claims, 4 Drawing Figures

ACTUATION DEVICE FOR A TACHOMETER FOR AN ENGINE

This is a continuation of application Ser. No. 687,644 filed May 18, 1976, now abandoned.

BACKGROUND OF THE INVENTION

A tachometer is used nowadays for measuring and indicating the revolutions of the crankshaft of an engine. Since the engine speed is high, it is necessary to reduce the engine speed in transmitting the revolutions of the engine crankshaft to the tachometer by means of a cable.

To this end, it has hitherto been common practice to use a speed reducing mechanism exclusively provided for the tachometer and interposed between the engine crankshaft and the drive shaft for the tachometer. The use of a speed reducing mechanism of a complex construction has disadvantages in that the mechanism may fail and additionally there is an increase in cost. In order to simplify the construction of the speed reducing mechanism, proposals have been made to use a mechanism wherein the worm mounted at the oil pump shaft is brought into meshing engagement with a tachometer acutating gear by utilizing the oil pump of the engine which is connected to the engine crankshaft through a gear train. However, this entails an undesirable multiplicity of component parts which makes the mechanism complex in construction and increases cost since a speed reducing mechanism used exclusively for the tachometer must be provided.

SUMMARY OF THE INVENTION

This invention has as its object the provision of a speed reducing mechanism for an engine tachometer which is compact in size.

The aforementioned object of the invention is accomplished by utilizing, as a speed reducing mechanism for actuating an engine tachometer, an oil pump which has plunger means driven by an engine at reduced speeds and moved in reciprocatory motion by means of a throttle lever, such oil pump being compact in size because the plunger means can be connected to a cable for actuating the tachometer by simple means.

This invention offers the advantage of eliminating the need to use a speed reducing mechanism which has hitherto been provided exclusively for the tachometer. The oil pump having rotary and reciprocatory plunger means has its speed reduced sufficiently to ensure that it performs a pumping action satisfactorily as compared with oil pumps of the prior art, so that it is possible to obtain an output for actuating the tachometer without reducing the number of revolutions of the plunger means. Thus, the need to use a speed reducing mechanism provided exclusively for the tachometer is eliminated, thereby making it possible to avoid undesirable multiplicity of component parts.

DESCRIPTION OF THE PREFERRED EMBODIMENT

Figure 1:
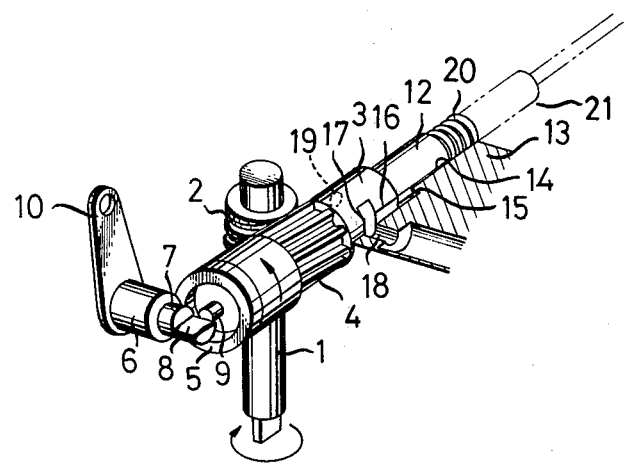
FIG. 1 is a perspective view of an oil pump having plunger means of the rotation and reciprocation type, showing its essential portions.

Referring to FIG. 1, there is shown a drive shaft 1 connected to an engine and having a worm 2, mounted thereon or formed integrally therewith, with which a worm gear 4 is maintained in meshing engagement. The worm gear 4 is secured to, or formed integrally with a plunger member 3 which is rotated at reduced speeds. The plunger member 3 is provided at one end thereof with a cylindrical lead 5. As the plunger member 3 is urged to move by the biasing force of a spring 37, the lead is resiliently seated on a guide 7 for a control shaft 6 supported by a pump body 13. With the guide 7 cooperating with the lead 5, the plunger member 3 makes one complete reciprocating movement while making one complete revolution.

Mounted at one end of the control shaft 6 is a cam 8 with which a projection 9 is brought into abutting engagement, such projection 9 extending from the end of the plunger member 3 at which the lead 5 is provided. A throttle lever 10 is connected to the other end of the control shaft 6. By pivotally moving the throttle lever 10 through any angle as desired, it is possible to rotate the control shaft 6 so as to adjust the position in which the cam 8 abuts against the projection 9. By this arrangement, it is possible to adjust the effective stroke (the quantity of oil delivered) of the plunger member 3.

There is also provided a differential plunger 12 which, together with the plunger member 3, is fitted in the bore formed in an stepped cylinder 14 of a pump body 13, so that an annular pump chamber 15 is defined between the outer surface of the differential plunger 12 and the inner surface of the cylinder 14. The annular pump chamber 15 may communicate with an outlet port 18 formed in the pump body 13, through a passage 16 formed in the plunger member 3 and a cutout 17. The pump body 13 is formed with a suction port 19. In the suction stroke of the pump in which the volume of the pump chamber 15 is increased by the axial movement of the plunger member 3, the cutout 17 of the plunger member 3 is brought into index with the suction port 19, thereby drawing oil by suction into the pump chamber 15. Conversely, in the compression stroke of the pump in which the volume of the pump chamber 15 is reduced, the cutout 17 is brought into index with the outlet port 18, thereby discharging the oil under pressure through the outlet port 18. A connection means 21 is provided to the plunger member 3 for directly transmitting the revolutions of the plunger member 3 to a tachometer. A spring 20 urges the differential plunger 12 to move in the direction of the plunger member 3 such that the lead 5 is maintained in intimate contact with the guide 7 as aforesaid.

Figure 2:
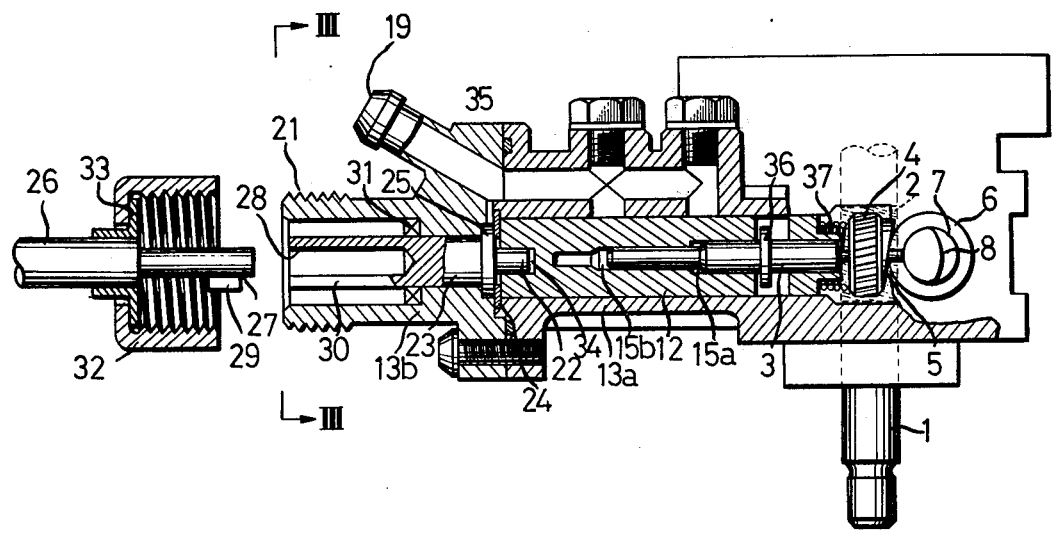
FIG. 2 is a vertical sectional view, with certain parts being shown in section, of an oil pump in which this invention is incorporated.
Figure 3:
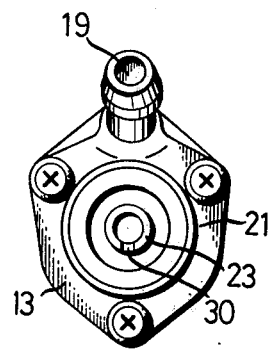
FIG. 3 is a view as seen in the direction of arrows III—III of FIG. 2.

FIG. 2 shows an embodiment of the invention in which the differential plunger 12 is formed separately from a connecting shaft 23. In the figure, parts similar in construction and function to those shown in FIG. 1 are designated by like reference characters. The pump body 13 consists of two members 13a and 13b, with an annular thrust washer 24 being interposed between the two pump body members 13a and 13b. An annular space is defined between one end surface of the thrust washer 24 and the end of the pump body member 13b for rotatably receiving therein a flange 25 formed integrally with the connecting shaft 23. The flange 25 performs the function of preventing the movement of the connecting shaft 23 in the axial direction. The connecting shaft 23 is formed therein with a bore 28 in which an inner core 27 of a cable 26 is received, and an axially disposed slit 30 (see FIG. 3) in which a projection 29 formed in the inner core 27 is fitted.

The numeral 31 designates an oil seal, the numeral 32 a cap formed therein with an internal threaded portion which threadably engages an external threaded portion of the pump body member 13b, and the numeral 33 a flange secured to an outer tube of the cable 26. When the cap 32 is threadably mounted on the pump body member 13b, the flange 33 is held between the cap 32 and the pump body member 13b to hold the outer tube of the cable 26 in place. The plunger 12 is formed at one end thereof with a recess 34 in which a projection 22 extending from the end portion of the connecting shaft 23 is engaged. The oil suction port 19 communicates through a radially extending duct 35 with an annular space in which the flange 25 is located, so that a small quantity of oil can be supplied to the connecting shaft 23 to lubricate the same. In the pump shown in FIG. 2, two pressure applying chambers 15a and 15b are defined between the bore formed in the plunger 12 to fit the plunger 3 therein and the plunger member 3. The numeral 36 designates a connecting pin for transmitting the rotation of the plunger member 3 to the differential plunger 12.

As the drive shaft 1 connected to the engine rotates, the differential plunger member 3 and the plunger 12 connected to the plunger member 3 through the connecting pin 36 rotate at a lower speed through the worm 2 and the worm gear 4 mounted on the plunger member 3 and maintained in meshing engagement with the worm 2. Since the lead 5 is resiliently seated on the guide 7 and they co-operate with each other, the plunger 3 makes one reciprocating movement while it makes one complete revolution. The member of revolutions of the plunger member 3 is set at a sufficient low level to ensure that the oil can be suctioned and compressed positively by the reciprocating movements of the plunger member 3. Moreover, the plunger member 3 rotates at all times at the number of revolutions which is in a predetermined ratio with respect to the number of revolutions of the engine crankshaft. Thus, the slow rotation of the differential plunger 12 is transmitted in the ratio of 1 to 1 to the connecting shaft 23 through the recess 34 formed in the plunger 12 and the projection 22 extending from the connecting shaft 23 and fitted in the recess 34. The rotation of the connecting shaft 23 is transmitted to a tachometer (not shown) through the projection 29 and inner core 27.

The present invention is based on the discovery that a plunger means of the rotation and reciprocation type used for an oil pump can have its number of revolutions greatly reduced because of the nature of an oil pump, with the plunger means being driven at the number of revolutions which is in a certain fixed ratio with respect to the number of revolutions of the crankshaft of the engine. The revolutions of the plunger means is transmitted through the connection means 21 to the tachometer. This eliminates the need to provide a speed reducing mechanism exclusively used for reducing the engine speed for the tachometer. The rotation of the engine crankshaft can be reduced to a sufficiently low level to enable the cable for the tachometer to rotate at a low rate without using a speed reducing mechanism. Thus, the present invention makes it possible to simplify the construction of a tachometer actuation device, to lengthen the service life of the cable, to obtain an overall compact size in a tachometer actuation device and to reduce cost.

Figure 4:
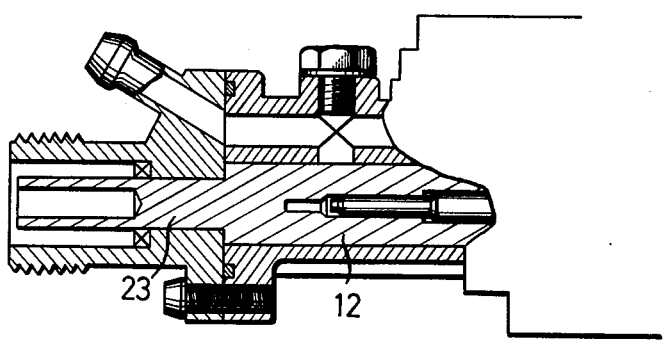
FIG. 4 is a fragmentary vertical sectional view of an oil pump comprising another embodiment of the invention.

FIG. 4 shows another embodiment of the invention in which the plunger 12 is formed integrally with the connecting shaft. This arrangement offers the advantages of greatly reducing the number of parts and hence reducing cost.

What we claim is:

1. Apparatus for actuating the tachometer of an engine comprising an oil pump assembly for supplying oil to said engine, said oil pump assembly including plunger means mounted for both rotative and reciprocal movement within said oil pump assembly, connection means for connecting said plunger means to the drive shaft of an engine to enable said plunger means to be rotatively driven by said engine drive shaft, said connection means including a speed reducing mechanism interposed between said plunger means and said engine drive shaft to effect rotative driving of said plunger means at a reduced speed relative to the speed of said engine drive shaft, cam means interposed between said plunger means and a throttle lever of said engine to enable said plunger means to be reciprocally moved by said throttle lever, and a cable connected to said plunger means and adapted to be connected to a tachometer for transmitting rotary motion from said plunger means of said oil pump assembly to said tachometer, said plunger means being formed with a pair of plunger members, one of said plunger members being reciprocally driven through said cam means and rotatively driven through said speed reducing mechanism, and the other of said plunger members being connected with said cable, said other plunger member being connected to said one plunger member to receive only rotary motion therefrom.

2. An assembly according to claim 1 further including a connecting shaft between said other plunger member and said cable, said connecting shaft and said other plunger member being arranged coaxially with each other and being connected together by a projection formed on one of said connecting shaft and said other plunger member with a recess having said projection engaged therein being formed upon the other of said connecting shaft and said other plunger member.

* * * * *